Patented Feb. 28, 1939

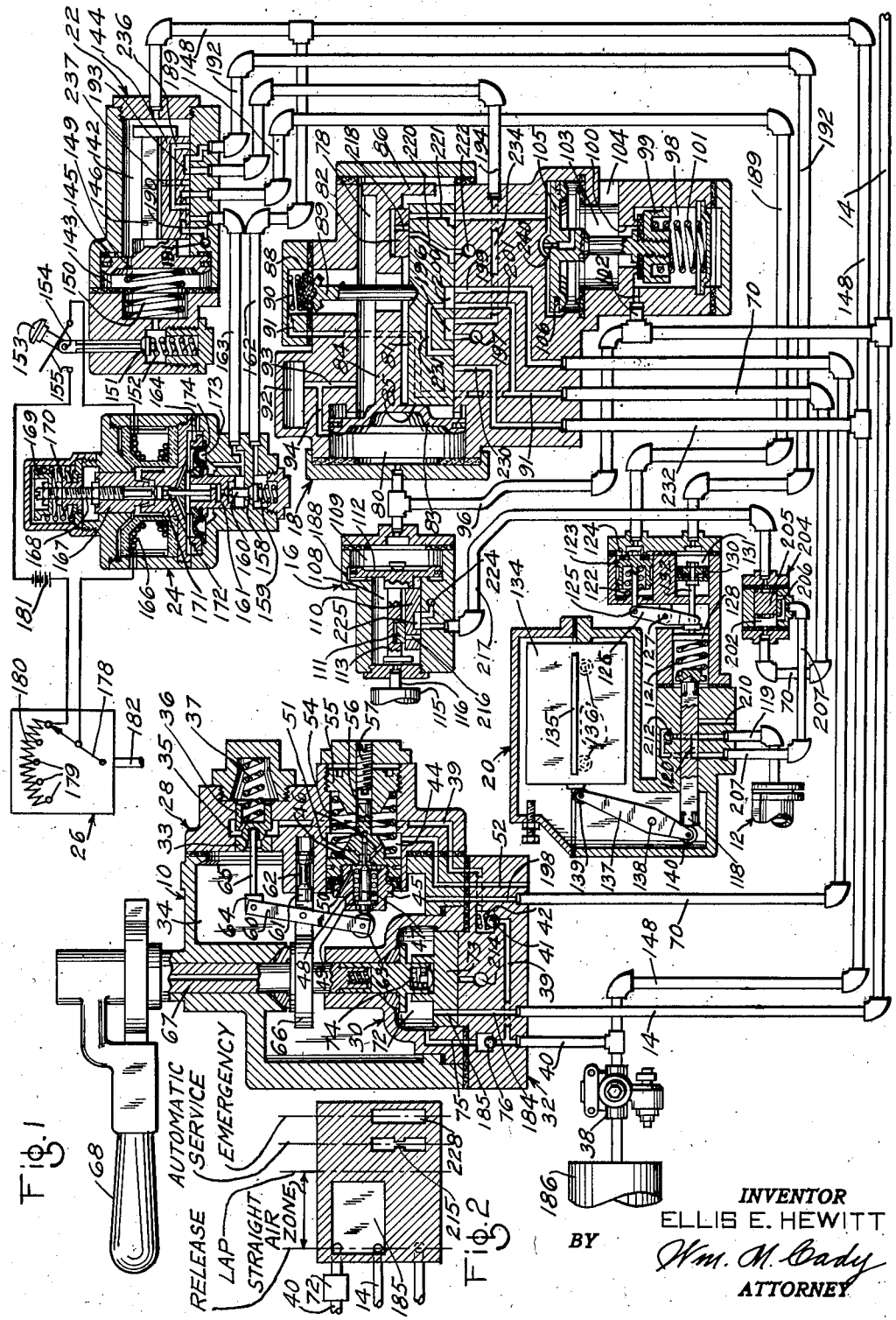

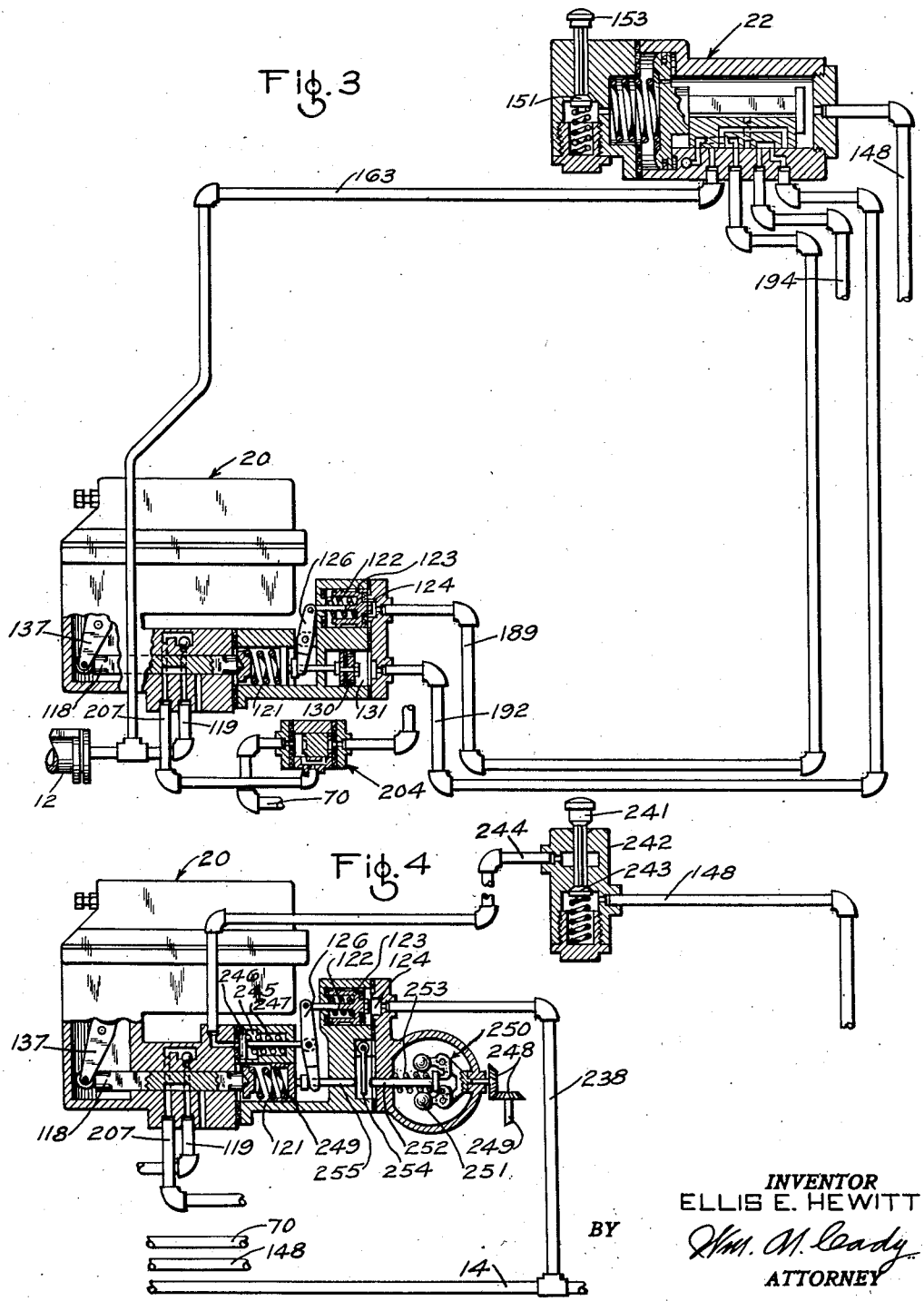

2,148,752

UNITED STATES PATENT OFFICE 2,148,752

RETARDATION CONTROLLED BRAKE

Ellis E. Hewitt, Edgewood, Pa., assignor to The Westinghouse Air Brake Company, Wilmerding, Pa., a corporation of Pennsylvania Application March 14, 1935, Serial No. 11,062

12 Claims. (Cl. 303—24)

This invention relates to retardation controlled brakes, and more particularly to brake systems for high speed railway trains in which the rate of retardation produced by an application of the brakes is prevented from exceeding one or more desired values.

Where railway trains are to be operated in high speed service it is desirable that some means be provided for preventing the rate of retardation produced by an application of the brakes from exceeding some desired maximum value, so as to prevent sliding of the wheels and so as to make a smooth stop. In brake systems heretofore proposed for such high speed trains a device commonly referred to as a retardation controller device has been provided for this purpose. An example of a brake system employing such a device is well illustrated in my copending application Serial No. 741,063, for a Brake equipment, filed August 23, 1934.

In brake systems of this character the retardation controller device is usually conditioned during service applications of the brakes to prevent rates of retardation higher than a certain value, while upon initiating emergency applications the retardation controller device is automatically conditioned to permit a higher rate. While in general the maximum permitted rate may be maintained throughout the deceleration period during a service application without undue discomfort to the passengers, or without producing violent shocks throughout the train at the end of the stop, if the higher emergency rate is maintained throughout the entire deceleration period, the same degree of comfort and freedom from shock may not result. Accordingly therefore, it is desirable during emergency applications that the maximum rate of retardation be reduced near the end of the deceleration period so that the train may be brought to a smooth stop free of shock.

With these considerations in mind, it is a principal object of my invention to provide a train braking equipment employing a retardation controller device, in which the maximum rate of retardation permitted by the retardation controller device may be reduced at the will of the operator near the end of the deceleration period, so as to make a smooth stop.

A further object of my invention is to provide specific means for conditioning a retardation controller device during an application of the brakes so that the maximum permitted rate of retardation will be automatically diminished at the end of the deceleration period.

A yet further object of my invention is to provide a combined straight air and automatic braking equipment having a retardation controller device for limiting the rate of retardation due to braking, in which the retardation controller device is conditioned to prevent rates of retardation above one maximum value during service applications, and to prevent rates above a higher value during emergency applications, and in which means are provided for reducing the maximum permitted rate during emergency applications near the end of the stop.

Yet further objects and advantages, including novel arrangements of specific apparatus for accomplishing the foregoing and other objects, will be apparent from the following description, taken in connection with the attached drawings, wherein, Figure 1 is a schematic view illustrating an embodiment of my invention depicted for the head end or control car of a train, in which the parts comprising the embodiment have been illustrated more or less diagrammatically.

Figure 2 is a view diagrammatically indicating the functioning of the rotary valve in the brake valve device illustrated at the top left of Figure 1.

Figure 3 is a fragmentary view illustrating a modification of portions of the apparatus shown in Figure 1.

Figure 4 is another fragmentary view illustrating still another modification of the embodiment of Figure 1.

In the complete embodiment shown in Figure 1, sufficient apparatus for the head end or control car only has been shown, but as the description of the invention proceeds it will be apparent to those skilled in the art that by the duplication of certain of the parts on succeeding cars, a complete train braking system results.

Considering the embodiment shown in Figure 1 briefly at first, there has been provided a brake valve device 10 for controlling all applications of the brakes. When a straight air application of the brakes is to be effected, the brake valve device 10 supplies fluid under pressure directly to a brake cylinder 12, and when applications are to be effected by automatic operation the brake valve device is operated to vent fluid under pressure from a brake pipe 14.

For operating in response to service reductions in brake pipe pressure to supply fluid under pressure to the brake cylinder 12, I have provided a triple valve device 16, and for operating in response to emergency reductions in brake pipe pressure to supply fluid under pressure to the brake cylinder I have provided an emergency valve device 18.

For controlling the flow of fluid to the brake cylinder 12 during either type of brake application, so as to prevent the rate of retardation from exceeding desired maximum values, there is provided a retardation controller device 20. For adjusting the retardation controller device 20 to provide for a reduced rate of retardation at the end of the deceleration period during an emergency application, there is provided a retardation controlling valve device 22, a self-lapping magnet valve device 24, and a speedometer rheostat 26.

Considering now these devices more in detail, the brake valve device 10 comprises a self-lapping portion 28, a rotary valve portion 30, and a pipe bracket portion 32. These portions assembled together define a pressure chamber 34.

The self-lapping portion 28 is provided for effecting and controlling applications of the brakes during straight air operation. This portion is provided with a valve chamber 35 in which is disposed a supply valve 36, urged toward a seat 33 by a spring 37. The valve chamber 35 is in communication with a feed valve device 38 by way of passage 39 and pipe 40. A check valve 41, held seated by a spring 42, is disposed in the passage 39, for a purpose which will appear later.

The self-lapping valve portion is also provided with a chamber 44 in which is operatively mounted a movable abutment 45 in the form of a piston, which contains interiorly thereof a release valve chamber 46. Disposed in the release valve chamber 46 is a release valve 47, which is urged away from its seat by a spring 48. The release valve 47 has a flanged extension adapted to engage a shoulder 49 on the movable abutment, to limit the travel of the release valve away from its seat.

The release valve chamber 46 is in communication with the pressure chamber 34 through a passage 50 in the movable abutment. To the right of the release valve seat, passages 51 lead to the portion of chamber 44 to the right of the movable abutment 45, and this portion of the chamber 44 is in communication with the atmosphere by way of passage 52.

The movable abutment 45 is subject on one side to fluid pressure in the pressure chamber 34 and on the other side to the pressure of a regulating spring 54. Tension on the spring 54 is regulated by a regulating member 55, which has a bore therein for receiving a guiding plunger 56 integral with the movable abutment. An adjusting screw 57 is provided for regulating the extent of movement of the movable abutment to the right.

It will thus be seen that the supply valve 36 controls the supply of fluid under pressure to the pressure chamber 34, and that the release valve 47 controls the release of fluid under pressure therefrom to the atmosphere.

For operating the supply valve 36 and the release valve 47, there is provided a mechanism including spaced levers 60 carried intermediate their ends by a movable pivot carrier 61 slidably interfitting with a bore 62 in the casing of the self-lapping portion. Rotatably disposed between the lower ends of the spaced levers 60 is a roller 63, which is adapted to engage the left end, or stem, of the release valve 47. Loosely held between the upper ends of the spaced levers 60 is a member 64 carrying a stem 65 having one end thereof disposed in a recess in the supply valve 36.

The spaced levers 60 are intended to effect a seating of the release valve 47 and unseating of the supply valve 36 when the movable pivot carrier 61 is actuated to the right. For actuating the pivot carrier 61 to the right, there is provided a cam 66 secured to an operating shaft 67, which shaft is adapted to be rotated by movement of a handle 68. The peripheral configuration of the cam 66 is such that when the handle 68 is moved from release position toward an extreme application position, as will be more fully described later, the cam actuates the movable pivot carrier 61 progressively to the right.

Movement of the pivot carrier 61 to the right carries with it the spaced levers 60. Now the supply valve spring 37 offers a greater resistance to this movement than the release valve spring 48, while the regulating spring 54 offers a greater resistance than either of these two springs. Therefore, upon movement of the pivot carrier to the right, the spaced levers 60 fulcrum about their upper ends to first cause seating of the release valve 47, and as this valve is seated the spaced levers fulcrum about their lower ends to then unseat the supply valve 36. During this movement of the spaced levers and the pivot carrier, the regulating spring 54 is unappreciably compressed.

With seating of the release valve 47 and unseating of the supply valve 36, fluid under pressure is supplied from the feed valve device 38 to the pressure chamber 34. The pressure chamber 34 is in constant communication with a straight air pipe 70, so that fluid under pressure flows through this straight air pipe to effect an application of the brakes, as will be more fully described presently.

As the pressure in the pressure chamber 34 rises, it will act upon the movable abutment 45 to compress the regulating spring 54, and as this spring is compressed the lower ends of the spaced levers 60 will move to the right and the upper ends will move to the left, thereby permitting supply valve 36 to seat. A little thought will show that if the pivot carrier 61 is actuated to the right a given distance after the release valve 47 is seated, the supply valve 36 will be unseated a proportional distance. Therefore, the pressure required in the pressure chamber 34 to effect seating of the supply valve by movement of the movable abutment to the right will likewise be proportional to this distance.

When the supply valve 36 is seated, the supply of fluid under pressure to the straight air pipe 70 will be lapped, and it will thus be apparent that the pressure at which the supply laps is governed by the degree of movement of the pivot carrier 61 to the right, and hence according to the degree of movement of the brake valve handle 68. The degree of pressure established in the pressure chamber 34 then corresponds to the degree or extent of movement of the handle 68 to application position.

The rotary valve portion 30 of the brake valve device comprises a casing defining a rotary valve chamber 72 in which is disposed a rotary valve 73. The rotary valve is held upon its seat in the pipe bracket section 32 by a spring 74 and fluid pressure in the chamber 72. The rotary valve 73 is adapted to be rotated upon rotation of the shaft 67, to control ports and passages hereinafter more fully described. The rotary valve chamber 72 is in constant communication with the feed valve device 38, by way of passage 75 and pipe 40. A check valve 76 is disposed in the passage 75, for a purpose which will be described later.

The rotary valve section 30 is provided for controlling applications of the brakes during automatic operation. Since both the self-lapping valve portion and the rotary valve portion are operated from the one handle 68, it will be apparent that all applications of the brakes, whether by straight air operation or by automatic operation, may be controlled by the simple manipulation of the one brake valve handle.

The emergency valve device 18 is embodied in a casing provided with a slide valve chamber 78 and a piston chamber 80. Disposed in the slide valve chamber 78 is a main slide valve 81 and mounted upon the main slide valve is a graduating valve 82. Disposed in the piston chamber 80 is a piston 83 having a stem 84 for operating the two slide valves. The stem 84 is recessed to receive the graduating valve 82 so as to move this valve coextensive with movement of the piston 83. The stem 84 is provided with shoulders 85 and 86 for engaging the main slide valve 81 after a lost motion movement of the piston 83.

The main slide valve 81 is held upon its seat by a loading mechanism comprising a flexible diaphragm 88 mounted in the casing of the valve device and adapted to be urged into engagement with a rocking pin 89 bearing upon the main slide valve. A spring 90 exerts a constant downward pressure upon the flexible diaphragm 88. The chamber above the diaphragm 88 is connected to a passage 91 so that when fluid under pressure is supplied to this passage a further pressure is exerted downwardly upon the diaphragm 88.

The slide valve chamber 78 is in communication with a quick action chamber 92 formed in the casing, by way of passage 93. A second passage 94 also serves to connect the quick action chamber 92 with the piston chamber 80. This second passage is normally open when the piston 83 is in release position, as shown in Figure 1, but when the piston moves outwardly to the left it disconnects this passage from the piston chamber 80.

The piston chamber 80 is in constant open communication with the brake pipe 14 by way of pipe 96, so that brake pipe pressure is maintained in the piston chamber.

Formed in a lower part of the casing of the emergency valve device is a vent valve chamber 98 in which is disposed a vent valve 99 urged toward its seat 100 by a spring 101. The vent valve chamber 98 is in communication with the brake pipe 14 by way of pipe and passage 102 and the aforementioned pipe 96. The vent valve 99 controls local venting of the brake pipe 14, and hence of emergency piston chamber 80 also, to a chamber 103 which is in open communication with the atmosphere by way of a large port 104.

For operating the vent valve 99 away from its seat there is provided a vent valve piston 105. When fluid under pressure is supplied to the space above the vent valve piston at a rapid rate, the piston actuates the vent valve 99 to unseated position to vent fluid under pressure from the brake pipe 14, and from the piston chamber 80, to the atmosphere. When the supply of fluid under pressure to the space above piston 105 is at a slow rate, it may leak around the piston by way of leak grooves 106 without actuating the piston downwardly to unseat the vent valve.

The main slide valve 81 is adapted to control ports and passages for a purpose and in a manner which will be more fully discussed in the description of operation of this embodiment of my invention.

The triple valve device 16 is embodied in a casing having a slide valve chamber 108 and a piston chamber 109. Disposed in the slide valve chamber 108 is a main slide valve 110 and mounted on top of the main slide valve is a graduating valve 111. Disposed in the piston chamber 109 is a piston 112 having a stem 113 recessed to receive the graduating valve 111 so as to move this valve coextensive with movement of the piston 112. As may be seen from the drawing of Figure 1, the piston stem 113 is also provided with shoulders adapted to engage the main slide valve 110 after a lost motion movement of the piston 112.

The piston chamber 109 is connected to the brake pipe 14 by way of the aforementioned pipe 96, and the slide valve chamber 108 is in constant open communication with an auxiliary reservoir 115 by way of pipe 116. The triple valve device 16 functions in response to service reductions in brake pipe pressure, to control the supply of fluid under pressure to and its release from the brake cylinder 12, as will be more fully described hereinafter.

The retardation controller device 20 is embodied in a casing provided with a slide valve 118 adapted to control the flow of fluid through pipes 119 and 207 to the brake cylinder 12. The slide valve 118 is provided with a cavity 120 which is adapted, in the position of the valve shown in the drawings, to permit flow to the brake cylinder, to cut off flow thereto when moved to the right to an intermediate position, and to release fluid under pressure from the brake cylinder in its farthermost position to the right, through an exhaust port 210.

The slide valve 118 is urged toward its biased position to the left by a regulating spring 121, which engages the right end of the slide valve, and toward various positions to the right by a body 134 moved according to the rate of retardation of the vehicle. Tension on the spring 121 may be adjusted by a service adjusting means comprising a spring 122, which acts upon a piston 123 disposed in a piston chamber 124. The piston 123 has a stem pivotally connected at 125 to one end of a lever 126 pivotally mounted intermediate its ends at 127 and adapted through its other end, which is bifurcated and straddles stem 132 so as to engage a collar thereon, to exert pressure on a movable abutment 128 to compress the regulating spring 121.

When the piston chamber 124 has been vented to the atmosphere, the service adjusting spring 122 actuates piston 123 the full distance to the right, whereupon the regulating spring 121 is compressed according to the full expansion of the service adjusting spring 122. The tension thus placed on the regulating spring 121 determines the maximum rate of retardation which is permissible during service application of the brakes.

For placing a greater tension on the regulating spring 121 so as to permit a higher rate of retardation during emergency application of the brakes, there is provided an emergency adjusting means comprising a piston 130 disposed in a piston chamber 131 and having a piston stem 132 adapted to engage the movable abutment 128. When the piston chamber 131 is vented to the atmosphere, the piston 130 exerts no pressure on the movable abutment 128, but when fluid under pressure is supplied to both piston chambers 124 and 131 upon initiating an emergency application of the brakes, the pressure exerted on piston 130 is effective in placing a greater tension on the regulating spring 121, while the pressure exerted on piston 123 holds the lever 126 against movement with rod 132 and thus releases the tension on the regulating spring 121 due to the service regulating spring 122. The retardation controller device is therefore conditioned to permit a higher rate of retardation during emergency applications.

Movement of the slide valve 118 to the right is governed by movement of the inertia operated body 134, which is provided with wings or flanges 135 supporting the inertia operated body upon frictionless rollers 136. The body 134 is normally held in a biased position to the right by action of the regulating spring 121 on the slide valve 118, which rotates a lever 137 about a pivot 138 to position the body 134.

The lever 137 is provided with a roller 139 for engagement with the body 134, and a similar roller 140 for engagement with the slide valve 118. When the inertia operated body 134 is caused to move to the left, it rotates the lever 137 in a counterclockwise direction about its pivot 138 to actuate the slide valve 118 to the right. The opposition to the movement of the body and consequently the slide valve 118, is determined by the tension on the regulating spring 121.

The retardation controller device 20 is positioned on the vehicle or train so that the inertia operated body 134 is urged toward the left when the train is decelerating. Therefore, it will be obvious that the slide valve 118 will be actuated to the right in accordance with the rate of deceleration of the train, and that the distance which slide valve 118 is actuated will depend upon the tension on the regulating spring 121.

The retardation controlling valve device 22 is embodied in a casing provided with a slide valve chamber 142 and a piston chamber 143. Disposed in the slide valve chamber 142 is a slide valve 144, and disposed in the piston chamber 143 is a piston 145 having a stem 146 for actuating the slide valve 144 coextensive with movement of the piston 145.

The slide valve chamber 142 is in constant open communication with the feed valve device 38 by way of pipe 148, while the slide valve chamber 142 has a restricted communication with the piston chamber 143 by way of a restricted port 149 in the piston 145.

The piston 145 is normally held in a biased position to the right by a spring 150 so long as the pressures in the piston chamber 143 and slide valve chamber 142 are substantially equal. When the pressure in piston chamber 143 is suddenly reduced, the overbalancing pressure in the slide valve chamber 142 actuates the piston to its extreme left hand position, to cause slide valve 144 to control ports and passages hereinafter more fully described.

For reducing the pressure in the piston chamber 143, there is provided a valve 151, normally urged toward a seated position by a spring 152. The valve 151 is adapted to be actuated to unseated position upon downward pressure exerted upon a push button 153. This push button has a pivotal connection at 154 with the fluted stem of the valve 151. Also associated with the push button 153 is a switch device having contacts 155 for controlling energization of the self-lapping magnet valve device 24.

The self-lapping magnet valve device 24 is embodied in a casing provided with a supply valve 158, which is urged toward a seated position by a spring 159. The supply valve 158 has a stem terminating in a release valve 160 which coacts with a release valve seat in a slidable member 161. When the release valve 160 is seated and the supply valve 158 unseated, fluid under pressure is supplied from the feed valve device 38 through pipe 148, branch pipe 162, and past the unseated supply valve 158 to a pipe 163. When the supply valve 158 is seated and the release valve 160 unseated, fluid under pressure supplied to the pipe 163, and hence to the volumes connected thereto, will be released to the atmosphere, past the unseated release valve 160 and through port 164.

For actuating the supply and release valves 158 and 160 to unseated and seated positions, there is provided in the upper part of the casing an electromagnet comprising a winding 166 suitably insulated from the casing, and a movable core element 167. The movable core element 167 is held in an upper position by a stem 168 having a spring cup 169 resting upon a spring 170.

When the winding 166 is energized, the movable core element 167 is attracted downwardly toward a stationary core element 171, compressing spring 170; and as a consequence a lower end of the stem 168 engages an idling stem 172 to actuate the slidable member 161 downwardly to first seat the release valve 160 and to then unseat the supply valve 158. The degree to which the supply valve 158 is unseated depends upon energization of the winding 166, the greater the degree of energization of this winding the greater the spring 170 will be compressed.

Fluid under pressure supplied to the pipe 163 upon unseating of the supply valve 158 also flows to a chamber 173 below a diaphragm 174, which with the valve device casing defines the chamber 173. The diaphragm 174 is secured to the slidable member 161, so that when the pressure acting below the diaphragm 174 overbalances that acting downwardly upon the slidable member 161 due to energization of the winding 166, the slidable member 161 will move upwardly until the supply valve 158 is seated, and as a result the supply of fluid under pressure to pipe 163 is cut off or lapped.

The resiliency of diaphragm 174 is such that the slidable member 161 is urged upwardly, so that if the winding 166 is deenergized or its energization reduced, the slidable member 161 will move upwardly to unseat the release valve 160, to release fluid under pressure from the pipe 163 until the pressures on either side of diaphragm 174 substantially balance. The pressure of fluid supplied to pipe 163 therefore depends upon the degree of energization of the winding 166.

For controlling energization of the winding 166, there is provided the aforementioned speedometer rheostat device 26. This device is essentially a speedometer of the type commonly employed to indicate the speed of vehicles, such for example as the type commonly employed on automobiles, and in general differs from the ordinary speedometer only in that the usual indicating dial has been replaced by a rheostat having an arm 178 adapted to engage contacts 179 to cut in or cut out portions of a resistance 180. The resistance 180 is interposed in a circuit between a battery 181 and the winding 166, so that the amount of resistance 180 in the circuit determines the degree of energization of the winding 166.

The speedometer rheostat device is connected to a wheel of the vehicle or train, or other rotating part rotating according to the speed of the vehicle, by a shaft member 182, and when the vehicle or train is traveling at the maximum rate of speed, the arm 178 will be in its extreme right hand position, as shown in Figure 1. As the speed of the train diminishes, the arm 178 moves toward its extreme left hand position, thereby cutting in portions of the resistance 180. It will thus be seen that when the push button 153 is depressed so that contacts 155 engage, winding 166 will be energized to a degree according to the speed of the train.

The operation of this embodiment of my invention as applied to one car in a train is as follows:

Running condition

When the train is running, the brake valve handle 68 is maintained in "Release" position. In this position the brake pipe 14 is maintained connected to the feed valve device 38, by way of passage 184, port 185 in rotary valve 73, rotary valve chamber 72, passage 75, and pipe 40. The feed valve device 38 is connected to a main reservoir 186, and, as is well known in the art, functions to supply fluid under pressure from the main reservoir 186 at a substantially constant pressure. This feed valve device is to be understood as being one of the types commonly employed in the art for this purpose.

With the brake pipe 14 thus maintained charged to feed valve pressure, both the quick action chamber 92 and the auxiliary reservoir 115 are charged to the same pressure. The quick action chamber 92 is supplied from the brake pipe 14 by way of pipe 96, emergency piston chamber 80, and passage 94, while the auxiliary reservoir 115 is supplied through pipe 96, triple valve piston chamber 109, feed groove 188, slide valve chamber 108, and pipe 116. So long as the brake pipe is maintained charged, triple piston 112 will be held in its left hand position and emergency valve device piston 83 will be held in its right hand position, as shown in Figure 1.

In the retardation controller device 20, the piston chamber 124 will be vented to the atmosphere by way of pipe 189, port 190 in slide valve 144 of the retardation controlling valve device 22, and through exhaust passage 191. At the same time, piston chamber 131 also will be vented to the atmosphere by way of pipe 192, cavity 193 in slide valve 144, pipe 194, cavity 196 in slide valve 81 of the emergency valve device 18, and exhaust port 197. The service regulating spring 122 will therefore be effective in placing a fixed tension on the regulating spring 121, and the retardation controller device will therefore be set to limit the rate of retardation for service applications of the brakes substantially to a fixed value.

Service applications by straight air operation

When it is desired to effect a service application of the brakes, by straight air operation, the brake valve handle 68 is moved through the zone indicated in Figure 2 as "Straight air zone" to a degree or extent in accordance with a desired degree of braking. During this movement the cam 66 actuates the pivot carrier 61 to the right to first seat the release valve 47, and to then unseat the supply valve 36.

Fluid under pressure then flows from the feed valve device 38 through pipe 40, passage 39, where it unseats the ball check valve 41, supply valve chamber 35, to the pressure chamber 34.

From the pressure chamber 34, the flow is through passage 198, a first portion of straight air pipe 70, passage 199 in the emergency valve device, cavity 200 in slide valve 81, passages 201 and 91, and a second portion of the straight air pipe 70 to a chamber 202 in a double check valve device 204. In this double check valve device a valve 205 is actuated to the right by the pressure of the fluid, to uncover a passage 206, and fluid then flows from the chamber 202 through pipe 207, cavity 129 of retardation controller slide valve 118, and pipe 119 to brake cylinder 12. As the pressure in the brake cylinder 12 builds up the brakes are thus applied.

As soon as the pressure in the pressure chamber 34, of the brake valve device 10, has reached a value corresponding to the degree or extent of movement of handle 68, the movable abutment 45 will move a sufficient distance to the right to lap the supply and consequently the brakes will be applied to a degree corresponding to the degree or extent of movement of the handle 68.

During this operation of the brake valve device 10, the brake pipe 14 is maintained connected to the feed valve device 38, as is diagrammatically indicated in Figure 2. When fluid under pressure is supplied to the brake cylinder by straight air operation, there may be an appreciable momentary drop in pressure in pipe 40 adjacent the feed valve device 38. If the check valve 76 in the brake valve device were not provided, this drop in pressure may be reflected in the brake pipe 14, and thus cause an undesired operation of either the triple valve device 16 or the emergency valve device 18. However, the check valve device 76 prevents a reduction of the pressure in the brake pipe while fluid is being supplied to the brake cylinder during straight air operation, so that it will be seen that neither the triple valve device 16 nor the emergency valve device 18 are operated during straight air applications of the brakes.

Fluid flowing to the brake cylinder 12 through passage 91 also flows to the chamber above diaphragm 88, where it exerts a downward pressure upon the diaphragm in addition to that exerted by spring 90, so as to hold the main slide valve 81 upon its seat.

Assuming now that the degree of application of the brakes has been sufficient to cause functioning of the retardation controller device 20, the inertia operated body 134 will move to the left and actuate the slide valve 118 to the right. When the slide valve 118 has been actuated far enough to blank the passage connecting with pipe 207, the brake cylinder will be isolated from the supply of fluid under pressure. If the rate of retardation should increase further so that the slide valve 118 is actuated to the right far enough to connect pipe 119 with exhaust port 210, fluid under pressure will be released from the brake cylinder.

The release of fluid under pressure from the brake cylinder will continue until the rate of retardation has been diminished sufficiently to cause the body 134 to move toward the right, whereupon slide valve 118 will disconnect pipe 119 from exhaust port 210. The supply to the brake cylinder will then again be lapped.

If now with diminishing speed the coefficient of friction between the rubbing parts of the brakes should increase sufficiently to cause the rate of retardation to again rise, a further release of fluid under pressure from the brake cylinder will be effected by the retardation controller device. It will be obvious therefore that the retardation controller device 20 will thereafter function to intermittently reduce the brake cylinder pressure, so as to maintain a rate of retardation corresponding to the tension on the regulating spring 121.

Since during this application of the brakes the fixed tension on the regulating spring 121 is maintained constant throughout the operation of the retardation controller device, it will be apparent that so long as the retardation controller device is controlling the brake cylinder pressure the rate of retardation will be maintained at a substantially constant value throughout the entire deceleration period.

When it is desired to effect a release of the brakes at any time, the brake valve handle 68 is turned to "release" position. In this position the release valve 47 is unseated and fluid under pressure is released from the pressure chamber 34 to the atmosphere. If the train is at rest when this release is effected, fluid under pressure will be released from the brake cylinder 12 through the same communication through which it was supplied, but if the release is made at a time when the retardation controller slide valve 118 blanks pipe 207, then check valve 212 in the retardation controller device will unseat to permit flow of fluid from the brake cylinder to the brake valve device.

Service applications by automatic operation

If for any reason the straight air portion of the brake equipment should be rendered inoperative, then service applications may be effected by automatic operation. To effect a service application of the brakes by automatic operation, the brake valve handle 68 is turned to the position indicated in Figure 2 as "Automatic service" position. In this position the brake pipe 14 is disconnected from the feed valve device 38, and reconnected to an exhaust port 214 by way of a port in the rotary valve having a restriction 215 therein. The brake pipe is thus vented to the atmosphere, with the handle 68 held in the "automatic service" position for a time sufficient to reduce the brake pipe pressure according to the desired degree of braking, after which the handle 68 is turned to the position indicated as "Lap" in Figure 2.

When the pressure in the brake pipe is thus reduced, triple valve piston 112 moves to the right due to the overbalancing pressure from the slide valve chamber 108. This movement of the piston closes the feed groove 188 and first carries the graduating valve 111 to the position where main slide valve port 216 is uncovered, and then carries the main slide valve 110 to the position where this port 216 registers with a passage connecting with pipe 217. Fluid under pressure then flows from the auxiliary reservoir 115 through port 216, and pipe 217, to the right of valve 205 in double check valve device 204. The valve 205 is then actuated to the left by the pressure of this fluid and the flow is then to the brake cylinder through the retardation controller 20 as heretofore described.

When the pressure on the left side of triple piston 112 becomes slightly below that on the right side, the piston will move to the left until graduating valve 111 blanks the main slide valve port 216. The supply of fluid under pressure to the brake cylinder will then be lapped.

At the same time the triple valve device 16 is operating, the emergency valve device piston 83 moves to the left far enough to blank passage 94 leading to the quick action chamber 92, and far enough for port 218 in the graduating valve 82 to register with port 220 in the main slide valve 81, but not far enough to uncover main slide valve port 221. Fluid under pressure in the slide valve chamber 78, and quick action chamber 92, then flows through ports 218 and 220 to the atmosphere by way of exhaust port 222.

The port 218 is so proportioned that the rate of drop in pressure in slide valve chamber 78 corresponds to the rate of drop in pressure in piston chamber 80, so that the piston 83 is arrested in the position in which ports 218 and 220 register. As soon as the pressure in slide valve chamber 78 drops below that in piston chamber 80, piston 83 moves toward the right and graduating valve 82 blanks the main slide valve port 220. The emergency valve device is thus caused to remain inoperative during service reductions in brake pipe pressure and, as will be more fully explained later, operates only in response to emergency reductions in brake pipe pressure.

It is intended that service applications of the brakes by automatic operation shall be effected only when the straight air portion of the equipment is inoperative. Of course if the straight air portion were operative, movement of the brake valve handle 68 to "automatic service" position would result in both straight air and automatic operation. It is preferable that the ultimate pressure of the fluid supplied by the feed valve device 38 shall be maintained greater than that supplied by the auxiliary reservoir 115, so that in such cases the double check valve 205 would remain to the right, as shown, and the application would be effected by straight air operation only.

During an automatic application of the brakes, the retardation controller device 20 is conditioned the same as for service applications by straight air operation, so that if the degree of application is sufficient to cause functioning of the retardation controller device, it will operate in the same manner as described for straight air applications. The maximum permitted rate is therefore the same for both service applications.

When it is desired to effect a release of the brakes following an automatic service application, the brake valve handle 68 is turned back to "release" position. In this position, as will be noted from Figure 2, the brake pipe is again connected to the feed valve device 38, and, upon restoration of the pressure in the brake pipe, triple piston 212 moves back to its release position, where pipe 217 is connected to exhaust port 224, by way of cavity 225 in slide valve 110. Fluid under pressure will then be released from the brake cylinder 12, through pipe 217, cavity 225, and exhaust port 224 to the atmosphere.

Emergency applications

When it is desired to effect an emergency application of the brakes, the brake valve handle 68 is turned to the position indicated in Figure 2 as "Emergency" position. In this position of the brake valve handle, the cam 66 actuates the pivot carrier 61 the maximum distance to the right, and at the same time the rotary valve 73 disconnects the brake pipe 14 from the feed valve device 38, and reconnects the brake pipe to exhaust port 214 through an enlarged port 228 in the rotary valve.

Movement of the pivot carrier 61 to the right actuates the self-lapping valve portion 28 to permit fluid pressure in pressure chamber 34 to build up to the maximum possible degree. Connection of the brake pipe to the atmosphere through enlarged port 228 vents the brake pipe to the atmosphere to reduce the pressure therein at an emergency rate.

When the pressure in the brake pipe is reduced at an emergency rate, the emergency piston 83 in the emergency valve device 22 is caused to move to the left far enough for graduating valve 82 to uncover main slide valve port 221. Fluid under pressure then flows from the slide valve chamber 78, and quick action chamber 92, to the space above the vent valve piston 105, and this flow takes place at a rapid rate so that sufficient pressure builds up above the vent valve piston to actuate the piston downwardly to unseat vent valve 99.

Unseating of vent valve 99 further vents fluid under pressure from the brake pipe 14, and piston chamber 80, to the atmosphere by way of exhaust port 104, so that there is a sharp drop in pressure immediately adjacent emergency piston 83. This drop takes place to a degree such that the overbalancing pressure to the right of the piston actuates it to its extreme position to the left. The slide valve 81, which up to this time has remained at rest, is thus moved to application position.

In application position, main slide valve 81 blanks the passage 199 and connects passage 201 to another passage 230 by way of port 231 in the slide valve. The passage 230 is connected to the feed valve device 38, by way of pipes 232 and 148, so that fluid under pressure flows directly from the feed valve device through pipes 148 and 232, passage 230, cavity 231, passage 201, straight air pipe 70, to the double check valve chamber 202, from whence it flows to the brake cylinder as before described. Emergency valve device 18 therefore functions to connect the feed valve device direct to the brake cylinder through a communication which by-passes the brake valve device 10.

In response to the emergency reduction in brake pipe pressure, triple valve piston 112 moves to its extreme right hand position where main slide valve port 216 registers with the passage connecting with pipe 217, but the double check valve 205 will blank flow from the auxiliary reservoir 115, unless there has been a failure of the supply effected through operation of the emergency valve device.

In the emergency valve device 18, cavity 200 in the main slide valve 81 connects passages 201 and 234, so that fluid under pressure flowing to the brake cylinder also flows through passage 234, pipe 194, cavity 193 in slide valve 144, and pipe 192 to piston chamber 131 in the retardation controller device 20. A tension is thus placed on the regulating spring 121 corresponding to feed valve pressure acting upon piston 130. If no further acts on the part of the operator were performed than heretofore described then, the retardation controller device 20 would thus be conditioned to permit a single maximum rate of retardation throughout the entire deceleration period, which might produce too abrupt a stop at the end.

If now the operator desires to make a smooth stop, he depresses the push button 153, thereby closing contacts 155 and unseating the valve 151.

Unseating of valve 151 vents the piston chamber 143 to the atmosphere past the unseated valve, and the overbalancing pressure in slide valve chamber 142 actuates the piston to its extreme left hand position, thereby compressing the spring 150. In this position of the piston, the slide valve 144 connects pipe 163 with pipe 192 by way of port 236 and brings slide valve port 237 into registration with the passage connecting with pipe 189. At this time the other passages in the slide valve seat are blanked. The choke port 149 in piston 145 is small enough to prevent undue loss of fluid during this operation of the valve device.

Closing of contacts 155 completes a circuit to the magnet valve device winding 166, through the speedometer rheostat device 26. If the speed at which the train is traveling is a maximum, rheostat arm 178 will be in the position shown in Figure 1 and consequently the winding 166 will be energized to a maximum degree. If the rheostat arm 178 is in some intermediate position, the winding 166 will be energized to a lower degree.

For any degree of energization, however, the winding 166 causes seating of release valve 160 and unseating of supply valve 158, whereupon fluid under pressure flows from the feed valve device through pipe 148, branch pipe 162, past the unseated supply valve 158, through pipe 163, slide valve port 236, and pipe 192, to retardation controller piston chamber 131. It will thus be evident that the pressure of fluid supplied to the piston chamber 131 will thereafter be controlled according to energization of winding 166 in the magnet valve device 24. The tension on regulating spring 121 will therefore be adjusted according to the speed of the vehicle.

Registration of slide valve port 237, in the retardation controlling valve device 22, with the pipe 189 supplies fluid under pressure from the slide valve chamber 142, and feed valve device 38, through this port, and pipe 189, to the retardation controller piston chamber 124. The pressure of fluid supplied to this chamber is thus at feed valve pressure, so that the piston 123 is actuated to the left compressing the service regulating spring 122. The effect of this is to rotate the lever 126 to unload the regulating spring 121 from any pressure which might be effected by the service regulating spring 122.

Since the operation of the emergency valve device 22 was to connect the brake cylinder 12 direct to the feed valve device 38, it will be evident that the degree of braking produced will be a maximum, and that the retardation controller device 20 will subsequently take control and regulate the brake cylinder pressure so as to maintain a varied rate of retardation according to the tension on the regulating spring 121.

In order that the emergency vent valve 99 shall be closed shortly after the brake pipe has been reduced at an emergency rate, a leak port 240 has been provided in the vent valve piston 105, so that after a predetermined length of time the pressure above the piston, and in slide valve chamber 78 and quick action chamber 92, will have been released to the atmosphere, and spring 101 will thereafter seat the vent valve.

During operation of the emergency valve device 18, it will be noted that the main slide valve 81 is loaded through operation of the diaphragm 88 in the same manner as described for service applications.

When it is desired to effect a release of the brakes following an emergency application, the brake valve handle 68 is turned to "release" position. In this position, the brake pipe is reconnected to the feed valve device, as before explained for a release following an automatic service application, and the pressure in the brake pipe is restored. Triple piston 212 and emergency valve device piston 83 then return to release position and fluid under pressure is released from the brake cylinder through the self-lapping portion 28 of the brake valve device, as described for a straight air application.

*Modification shown in Figure 3*

In Figure 3 is shown a modification of a portion of the apparatus depicted in Figure 1, whereby the tension placed on the regulating spring 121 of the retardation controller device 20 is controlled according to brake cylinder pressure. As will be seen from this figure, pipe 163, which was connected to the self-lapping magnet valve device 24 in Figure 1, is now connected to the brake cylinder 12. The retardation controlling valve device 22 is the same as that shown in Figure 1, except that the push button 153 is now made rigid with the stem of valve 151, and the switch contacts 155 are omitted.

If during an emergency application of the brakes the operator desires to have the rate of retardation reduced toward the end of the deceleration period, he presses the push button 153, as before, and the pressure of fluid supplied to the retardation controller piston chamber 131 now corresponds to brake cylinder pressure, so that the tension placed on regulating spring 121 decreases as the pressure in the brake cylinder is decreased.

From the use of like numerals in Figure 3 to indicate like parts in Figure 1, it will be observed that the remainder of the apparatus shown has been unchanged.

*Modification shown in Figure 4*

In Figure 4 I have shown a further modification of the means for regulating the tension on the regulating spring 121, in which the tension of this regulating spring is governed either by brake pipe pressure or by the operation of a centrifuge device.

The piston chamber 124, heretofore referred to, is now connected to the brake pipe 14 by way of branch pipe 238, instead of being connected to the retardation controlling valve device 22, as shown in Figure 1. The piston 123 is therefore subject to brake pipe pressure at all times. When the brake pipe is charged, the piston 123 is held to the left where it compresses the spring 122. In this position of the piston 123, the lower end of lever 126 compresses the regulating spring 121 through the abutment 239 only to the desired degree for conditioning the retardation controller device for limiting the rate of retardation during service applications.

When an emergency application of the brakes is effected by a reduction in brake pipe pressure, the piston 123 moves to the right and additional tension is then placed on the regulating spring 121 by expansion of the spring 122. If the operator desires to make a smooth stop, he depresses the push button 241 in the valve device 242, which has now replaced the retardation controlling valve device 22 of Figure 1. This unseats a valve 243, which connects the aforementioned pipe 148 leading to the feed valve device 38 with another pipe 244, which leads to a piston chamber 245 having a piston 246 disposed therein. The pressure of the fluid supplied from the feed valve device to this piston chamber actuates piston 246 to the right, compressing spring 247, and thus moving the fulcrum point of lever 126 to the right so that the tension placed on the regulating spring 121 by expansion of the spring 122 is released.

Thereafter the tension placed on the regulating spring 121 is controlled by a centrifuge device 250 in accordance with the outward movement of centrifuge weights 251 which act upon a stem 252 to actuate it to the left against opposition of a spring 253. The weights 251 are rotated at a speed proportional to vehicle speed, through gears 248 and shaft 249.

When the train is traveling at or near its maximum speed, the centrifuge weights 251 will be in their outermost position and stem 252 will then engage a pivoted finger 254 to actuate it into engagement with another stem 255 and thus cause the stem to push the abutment 249 to the left to place a maximum tension on spring 121. As the speed of the vehicle diminishes the tension on the regulating spring 121 will diminish, so that the maximum rate of retardation permitted by the retardation controller diminishes according to the decrease in speed.

It will thus be seen from the various embodiments shown that I have provided a number of ways in which the adjustment of the retardation controller device may be controlled, and in each case the maximum permitted rate may be decreased toward the end of the deceleration period, so that a smooth stop may be made.

While I have described one complete embodiment of my invention and two modifications thereof, it is to be understood that I do not desire to be limited to these specific embodiments or otherwise than by the spirit and scope of the appended claims.

Having now described my invention, what I claim as new and desire to secure by Letters Patent, is:

1. In a vehicle brake system, in combination, a brake cylinder, means for effecting a supply of fluid under pressure to the brake cylinder, a retardation controller device having an element movable according to the rate of retardation of the vehicle, means responsive to movement of said element for controlling the supply of fluid under pressure to and its release from the brake cylinder, fluid pressure controlled means for controlling movement of said element, electroresponsive valve means for controlling supply of fluid under pressure to said fluid pressure controlled means, and speed controlled means for controlling said electroresponsive valve means.

2. In a vehicle brake system, in combination, a retardation controller device having an element movable according to the rate of retardation of the vehicle, yielding means for opposing movement of said element, service regulating means for conditioning said yielding means during service applications of the brakes, emergency regulating means for conditioning said yielding means during emergency applications of the brakes, means for rendering said service means ineffective and for rendering said emergency means effective according to the speed of the vehicle, brake means, and means responsive to movement of said element for controlling said brake means.

3. In a vehicle brake system, in combination, a retardation controller device having an element movable according to the rate of retardation of the vehicle, yielding means for opposing movement of said element, fluid pressure operated service means for conditioning said yielding means during service application of the brakes, fluid pressure operated emergency means for conditioning said yielding means during emergency application of the brakes, said service means being rendered ineffective and said emergency means being rendered effective upon the supply of fluid under pressure to each, a valve device having a biased position and being operable to a position to supply fluid under pressure to both said service means and said emergency means, means for controlling the degree of fluid supplied to said emergency means according to the speed of the vehicle, brake means, and means responsive to movement of said element for controlling said brake means.

4. In a vehicle brake system, in combination, a brake cylinder, means for effecting a supply of fluid under pressure to the brake cylinder, a retardation controller device having an element movable according to the rate of retardation of the vehicle, means responsive to movement of said element for controlling said supply, yielding means for opposing movement of said element, fluid pressure operated means for conditioning said yielding means to oppose movement of said element according to the supply of fluid under pressure thereto, electroresponsive valve means operable to supply fluid under pressure to operate said fluid pressure operated means according to the degree of energization thereof, and speed controlled means for controlling the degree of energization of said electroresponsive valve means.

5. In a vehicle brake system, in combination, a brake cylinder, means for effecting a supply of fluid under pressure to the brake cylinder, a retardation controller device having an element movable according to the rate of retardation of the vehicle, a spring for opposing movement of said element, service conditioning means for normally exerting a substantially constant pressure on said spring and operable upon the supply of fluid under pressure thereto to release pressure on said spring, emergency conditioning means operable to exert a pressure upon said spring according to the degree of pressure of fluid supplied thereto, a valve device having a normally biased position and being operable to a position for supplying fluid under pressure to both said service means and emergency means, an electroresponsive valve device for controlling the supply of fluid under pressure to said emergency means according to the degree of energization thereof, a rheostat device operated according to the speed of the vehicle for controlling energization of said electroresponsive valve means, and means responsive to a predetermined movement of said element for effecting a release of fluid under pressure from the brake cylinder.

6. In a vehicle brake system, in combination, brake means, means for effecting either a service application or an emergency application of said brake means, a retardation controlled device operated according to the rate of retardation of the vehicle, means responsive to operation of said retardation controller device for controlling the degree of application of said brake means, means for conditioning said retardation controller device to permit one maximum rate of retardation during service applications and to permit a higher rate during emergency applications, and means selective at the will of the operator for controlling said last means during emergency applications of the brakes to vary the maximum permissible rate of retardation according to the speed of the vehicle.

7. In a vehicle brake system, in combination, a brake cylinder, a first valve means operable to supply fluid under pressure to the brake cylinder to effect a service application of the brakes, a second valve means operable to supply fluid under pressure to the brake cylinder to effect an emergency application of the brakes, a retardation controller device having an element movable according to the rate of retardation of the vehicle, means operable upon a predetermined movement of said element for first cutting off the supply to and then releasing fluid under pressure from the brake cylinder, resilient means for opposing movement of said element, service conditioning means for exerting a substantially constant pressure on said resilient means and operable upon the supply of fluid under pressure thereto to release said pressure, emergency conditioning means operable to exert pressure on said resilient means according to the supply of fluid under pressure thereto, said second valve means being operable to supply fluid under pressure to said emergency conditioning means to a degree corresponding to the degree of fluid under pressure supplied thereby to the brake cylinder, and means selective at the will of an operator for subsequently varying the pressure of fluid supplied to said emergency conditioning means according to the speed of the vehicle.

8. In a vehicle brake system, in combination, a brake cylinder, means for effecting a supply of fluid under pressure to the brake cylinder, a retardation controller device having an element movable according to the rate of retardation of the vehicle, means responsive to a predetermined movement of said element for first cutting off and then releasing fluid under pressure from the brake cylinder, yielding means for opposing movement of said element, fluid pressure operated means for causing said yielding means to oppose movement of said element according to the degree of pressure of fluid supplied thereto, means operable when effecting an application of the brakes to supply fluid under pressure to said fluid pressure operated means according to the pressure of fluid supplied to the brake cylinder, an electroresponsive valve device operable to control the pressure of fluid supplied to said fluid pressure operated means according to the degree of energization thereof, speed controlled means for controlling the degree of energization of said electroresponsive valve means according to the speed of the vehicle, and means selective at will for rendering said electroresponsive valve means effective in controlling the pressure of fluid supplied to said fluid pressure operated means.

9. In a vehicle brake system, in combination, brake means, a retardation controller device having an element movable according to the rate of retardation of the vehicle, means responsive to a predetermined movement of said element for effecting a release of said brake means, yielding means for opposing movement of said element, a brake pipe, means operated upon a reduction in brake pipe pressure for conditioning said yielding means to oppose movement of said element with a force of opposition proportional to the reduction in brake pipe pressure, a centrifuge device operated according to the speed of the vehicle, and means selective at will for transferring the conditioning of said yielding means to said centrifuge device.

10. In a vehicle brake system, in combination, a brake cylinder, means for effecting a supply of fluid under pressure to the brake cylinder by straight air operation, means for effecting a supply of fluid under pressure to the brake cylinder by automatic operation, a retardation controller device having an element movable according to the rate of retardation of the vehicle, valve means responsive to movement of said element for controlling the supply of fluid under pressure to and its release from the brake cylinder whether supplied by straight air operation or by automatic operation, yielding means for opposing movement of said element, service conditioning means for conditioning said yielding means only during straight air operation, emergency conditioning means for conditioning said yielding means only during automatic operation, and means operable during automatic operation to control said emergency conditioning means according to the speed of the vehicle.

11. In a vehicle brake system, in combination, a retardation controller device having an element movable according to the rate of retardation of the vehicle, yielding means for opposing movement of said element, service regulating means for conditioning said yielding means during service applications of the brakes, emergency regulating means for conditioning said yielding means during emergency applications of the brakes, and means for rendering said service means ineffective and for rendering said emergency means effective according to the speed of the vehicle.

12. In a vehicle brake system, in combination, fluid pressure brake means, a source of supply of fluid under pressure, a brake pipe, automatic valve means operable upon a reduction in brake pipe pressure for supplying fluid under pressure to effect an application of said brake means, a brake valve device operable to also effect a supply of fluid under pressure from said source to effect an application of said brake means, said brake valve device establishing and maintaining a communication between said source and said brake pipe during said operation, and a check valve device operable to prevent fluctuations in brake pipe pressure when the pressure of said source is diminished due to the supply of fluid effected by said operation of said brake valve device.

ELLIS E. HEWITT.